Figure 1:
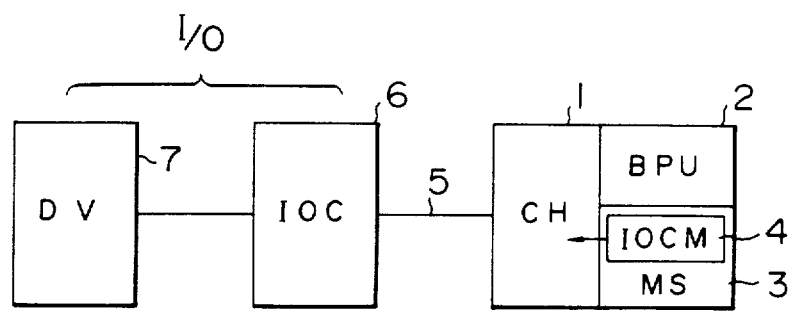

United States Patent [19]

Kadowaki

[11] Patent Number: 4,516,202
[45] Date of Patent: May 7, 1985

[54] INTERFACE CONTROL SYSTEM FOR HIGH SPEED PROCESSING BASED ON COMPARISON OF SAMPLED DATA VALUES TO EXPECTED VALUES

[75] Inventor: Yoshihiko Kadowaki, Hadano, Japan

[73] Assignee: Hitachi, Ltd., Tokyo, Japan

[21] Appl. No.: 288,498

[22] Filed: Jul. 30, 1981

[30] Foreign Application Priority Data

Jul. 31, 1980 [JP] Japan ................................. 55-105241

[51] Int. Cl.³ ............................................. G06F 1/00
[52] U.S. Cl. .................................... 364/200; 364/400
[58] Field of Search ............... 364/200, 900, 492, 494, 364/400, 130, 140; 290/40 R; 340/892.5

[56] References Cited

U.S. PATENT DOCUMENTS

| | | | |
|---|---|---|---|
| 3,319,226 | 5/1967 | Mott et al. | 364/200 |
| 3,792,442 | 2/1974 | Koeijman | 364/200 |
| 3,794,981 | 2/1974 | O'Connor | 364/200 |
| 3,813,652 | 5/1974 | Elmer et al. | 364/200 |
| 3,939,329 | 2/1976 | Doran | 364/140 |
| 3,949,380 | 4/1976 | Barbour et al. | 364/200 |
| 4,084,237 | 4/1978 | Beachem et al. | 364/400 |
| 4,219,875 | 8/1980 | Templeton | 364/200 |
| 4,223,379 | 9/1980 | Simcoe | 364/400 |
| 4,267,458 | 5/1981 | Uram et al. | 290/40 R |
| 4,318,173 | 3/1982 | Freedman et al. | 364/200 |
| 4,326,248 | 4/1982 | Hinai et al. | 364/200 |
| 4,338,660 | 7/1982 | Kelley et al. | 364/200 |
| 4,363,090 | 12/1982 | Garcia | 364/140 |
| 4,432,047 | 2/1984 | Okayama | 364/140 |

OTHER PUBLICATIONS

Meltzer et al., (Abd-Alla and Meltzer), Principles of Digital Computer Design, p. 201, 1976.

*Primary Examiner*—Gareth D. Shaw
*Assistant Examiner*—Jameson Lee
*Attorney, Agent, or Firm*—Antonelli, Terry & Wands

[57] ABSTRACT

An interface control system between a plurality of devices, such as a channel and an I/O device, includes sampling means for high speed sampling input control signals on an interface, a compare circuit for comparing a current sampled value sampled by the sampling means with an expected value for the input control signal previously prepared in the system and with a previously sampled value, respectively, to produce a compare equal signal when the sampled value is equal to the expected value, a matrix logic circuit responsive to the compare equal signal to set an output signal line corresponding to the expected value and an expected value for next sampling, and a circuit to produce a signal indicating an error condition or an exceptional condition when the sampled value is not equal to the expected value and the previous sampled value, to activate another logic circuit.

19 Claims, 8 Drawing Figures

FIG. 6A

| SEQ CODE (SQCD) | 0 1 | (START SEQUENCE) | | | | |
|---|---|---|---|---|---|---|
| SEQ COUNT (SQCT) | 0 0 0 | 0 0 1 | 0 1 0 | 0 1 1 | 1 0 0 | 1 0 1 |
| STAGE COUNT (STCT) | 0000 0001 | 0000 0101 ~ | 0000 0001 ~ | 00000 00010 ~ | 0000 0001 ~ | 0000 0010 |
| CYCLE COUNT (CYCT) | $\overline{00}$ 01 | $\overline{01}$ 82 ~ | $\overline{00}$ 01 ~ | $\overline{000}$ 013 ~ | $\overline{00}$ 01 ~ | $\overline{00}$ 13 |
| OUT TAG | | | | | | |
| OPL OUT | 1 | 1 1 | 1 | 1 | 1 | |
| HLD OUT | 0 | 0 1 | 1 | 1 | 1 | |
| SEL OUT | 0 | 0 1 | 1 | 1 | 1 | |
| ADR OUT | 0 | 1 1 | 0 | 0 | 0 | |
| CMD OUT | 0 | 0 0 | 0 | 1 | 0 | |
| SRV OUT | 0 | 0 0 | 0 | 0 | 0 | |
| DAT OUT | 0 | 0 0 | 0 | 0 | 0 | |
| SUP OUT | 0 | 0 0 | 0 | 0 | 0 | |
| MRKO OUT | 0 | 0 0 | 0 | 0 | 0 | |
| MRKI OUT | 0 | 0 0 | 0 | 0 | 0 | |
| IN TAG EXP | | | | | | |
| REQ IN | X | X | X | X | X | |
| SEL IN | X | 0 | 0 | 0 | 0 | |
| OPL IN | X | 1 | 1 | 1 | 1 | |
| ADR IN | X | 0 | 1 | 0 | 0 | |
| STA IN | X | 0 | 0 | 0 | 1 | |

FIG.6B

| SEQ CODE | | (START SEQUENCE) |
|---|---|---|
| INTAG EXP | SRV IN | X O O O O |
| | DAT IN | X O O O O |
| | DISC IN | X O O O O |
| | MRKO IN | X O O O O |
| | MRKI IN | X O O O O |
| INTAG MASK | REQ IN | X I |
| | SEL IN | X O |
| | OPL IN | X O |
| | ADR IN | X O |
| | STA IN | X O |
| | SRV IN | X O |
| | DAT IN | X O |
| | DISC IN | X O |
| | MRKO IN | X O |
| | MRKI IN | X O |
| BUS OUT SET | O I        I |
| BUS IN SET | O      I,A(BR I)    I S    (BRO) |
| BUS OUT ID | OA (BR3)    C (BR2) |
| SAMPLE INHIBIT | I I I O O O O I O O O I I O O I O O O I I |
| EXP. CHANGE | I   I   I   I |
| STEAL REQ | |

INTERFACE CONTROL SYSTEM FOR HIGH SPEED PROCESSING BASED ON COMPARISON OF SAMPLED DATA VALUES TO EXPECTED VALUES

The present invention relates to an interface control system, and more particularly to an interface control system among a plurality of devices such as among a channel and I/O devices.

Referring to FIG. 1, an I/O interface will be explained as an example of the interface control system among a plurality of devices. Coupling between a channel 1 and an I/O controller 6 is provided by way of a channel interface 5, which is normally standardized among the same type of machines.

When a basic processing unit (BPU) executes an I/O instruction, the channel 1 reads out a channel program 4 stored in a main storage 3 to sequentially execute commands.

In executing the channel commands, if the channel 1 needs to exchange information with the I/O controller 6 or the device 7, such as a disc device, a magnetic tape device or a line printer, the channel 1 sends out a control signal through the interface 5 or receives a signal from the I/O controller 6.

The operation sequence of the channel interface is called a sequence which includes three sequences, start, transfer and report. The start sequence is carried out in the order of send-out of a device address, send-out of a command and receipt of a status, the transfer sequence is carried out in the order of receipt of a device address and send-out and receipt of data, and the report sequence is carried out in the order of receipt of a device address and receipt of a status.

When a command with a data transfer has been executed and a predetermined amount of data has been transferred, the execution of the command terminates. A command without a data transfer, on the other hand, terminates in the start sequence. In any case, as the channel operation has been completed, the report sequence is carried out.

The operation mode in the data transfer sequence of the channel interface includes a byte mode in which the transfer sequence is sectioned byte by byte and a burst mode in which the sequence is carried out until the channel termination while omitting the receipt of the device address to attain a high speed transfer.

When an operational-out (OPL OUT) signal in FIG. 2(a) is "1", it shows that the channel is ready to operate. An address-out signal in FIG. 2(f) is sent out and then a hold-out (HLD OUT) signal in FIG. 2(c) and a select-out signal in FIG. 2(d) is sent out. FIG. 2(b) is a request-in signal which becomes on in the I/O controller when a transfer sequence or a report sequence has started in the I/O side. As a result, an operational-in (OPL IN) signal in FIG. 2(g) is sent out of the I/O device as shown in FIG. 2(e). A select-in signal of FIG. 2(e) is a return signal of the select-out signal. After the address-out (ADR OUT) signal in FIG. 2(f) has fallen, an address-in (ADR IN) signal in FIG. 2(h) rises and a command-out (CMD OUT) signal in FIG. 2(i) is sent out. When the address-in signal falls, the command-out signal falls. Thereafter, when a status-in (STA IN) signal in FIG. 2(j) rises, a service-out (SRV OUT) signal in FIG. 2(k) rises, and when the status-in signal falls, the service-out signal falls.

FIGS. 2(l) and (m) represent a bus-in signal and a bus-out signal, respectively. In FIG. 2(l), the address and the status are received at time points corresponding to the address-in and the status-in on a tag line, and in FIG. 2(m) the address and the command are sent out at time points corresponding to the address-out and the command-out on the tag line.

When the signals are sent and received in this manner, the channel and the I/O device form a logic arrangement for detecting signal changes, one for each signal for example, INTAG signal when looked from the channel side and OUTTAG signal from I/O device and send out responses or detect errors by various combinations of the logic.

Generally, in the control logic of the interface for the plurality of devices, the meanings of the signals received from the transmitting devices in accordance with a predetermined interface operation specification are decoded with reference to status information in the receiving device, which sends back an appropriate response signal and updates the status information in the receiving device as required. The above system is known as an I/O interface between channel and I/O controller in the IBM system model 360 or 370.

However, a prior art interface control logic arrangement of this type has many disadvantages in that (1) the response signal is delayed because the meaning of the signal from the transmitting device is decoded with reference to the status in the receiving device to prepare the response signal after the signal has been received from the transmitting device, (2) the control logic is complex and sophisticated because a normal process for the input signal and an error process for the input signal which violates the interface operation specification are handled by the same logic, and (3) the devices having different interface operation specifications have to be provided with separately designed logic.

It is an object of the present invention to provide an interface control system which can respond at a high speed, can be used commonly to the devices of different interface specifications, and has separate logic for executing the normal process and the error process to form a control logic which is simple.

An interface control system in accordance with one aspect of the present invention samples signal lines on an interface at a high speed, compares it with an expected value of the input signal line previously prepared in the device including logic therein and a previously sampled value and sets an output signal line corresponding to the expected value if the sampled value is equal to the expected value and prepares a next expected value, and if the sampled value is different from the expected value and the previously sampled value, it determines as the error condition or an exceptional condition and activates the other logic. The former logic may include a RAM whose contents can be altered in accordance with required interface specifications.

Figure 2:
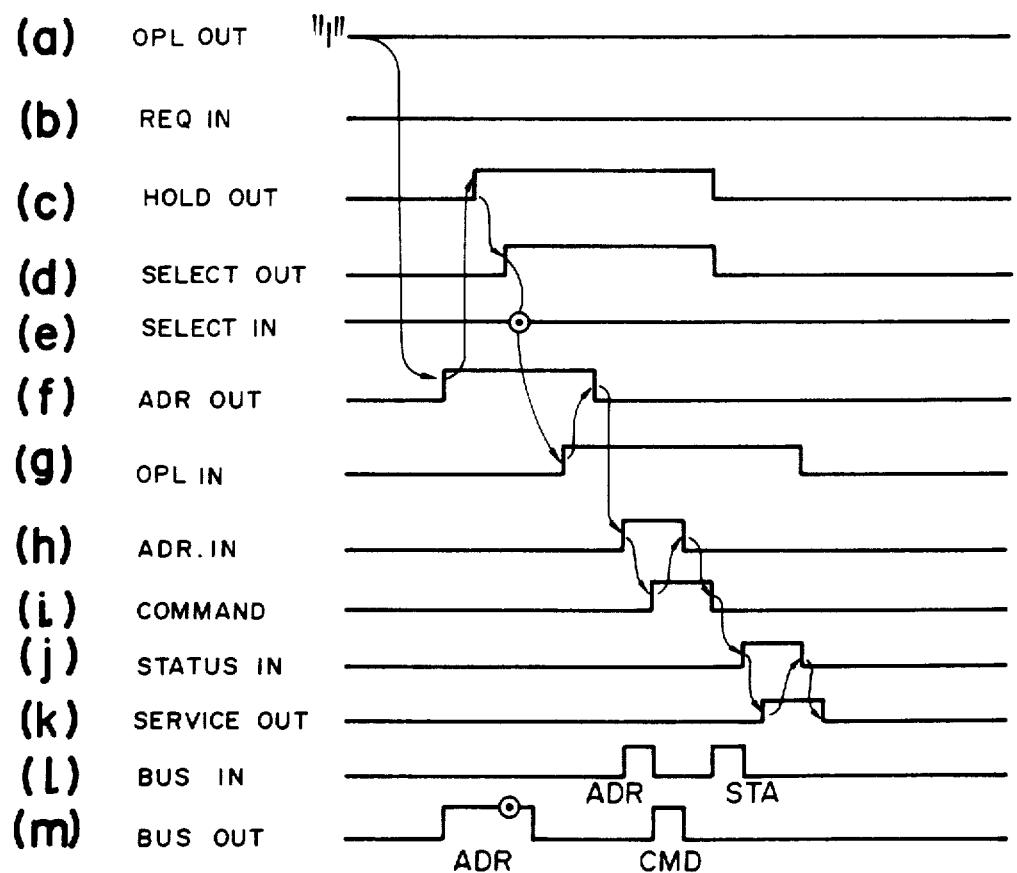
Figure 3:
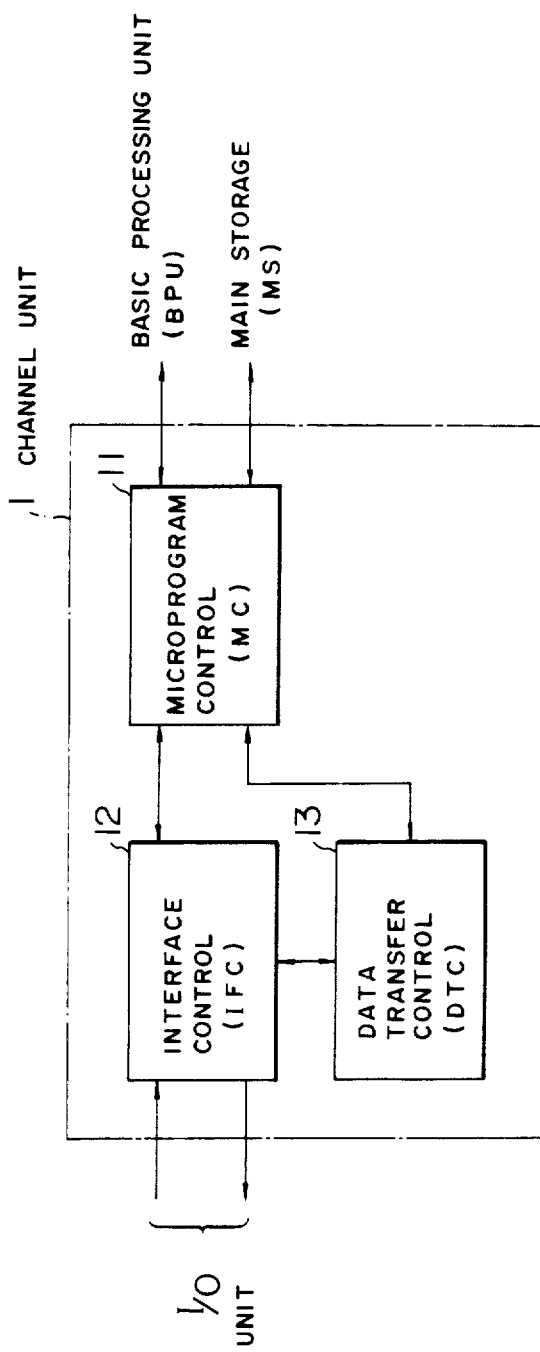
Figure 4:
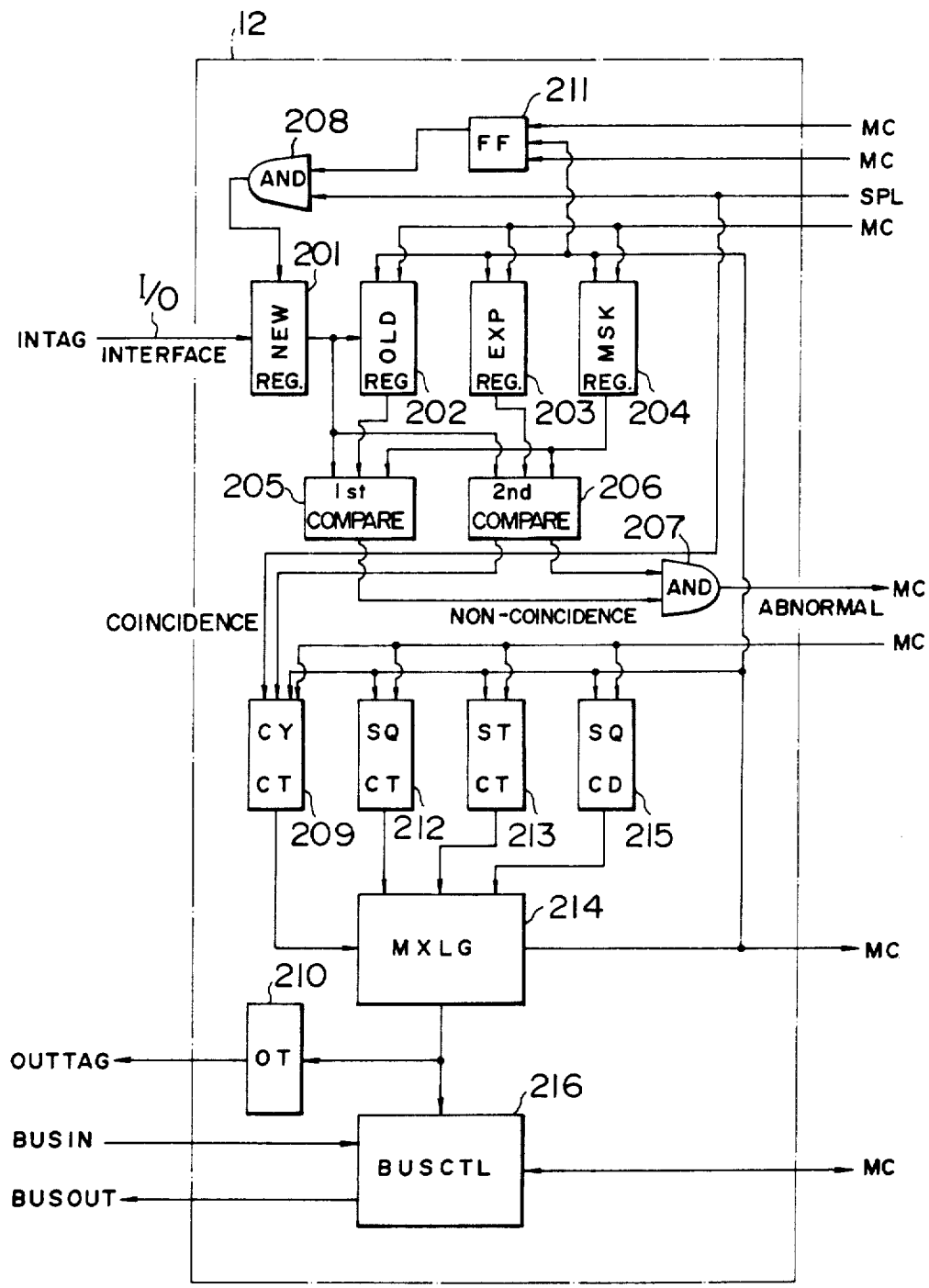
Figure 5:
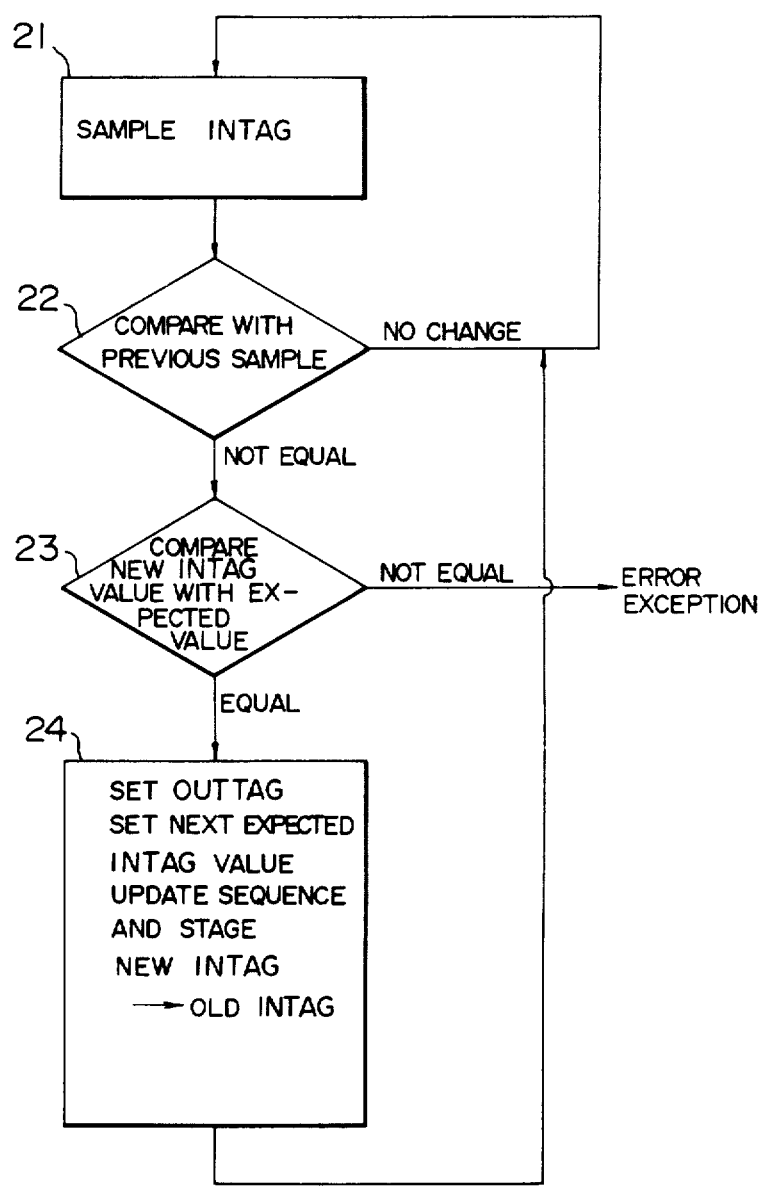
Figure 7:
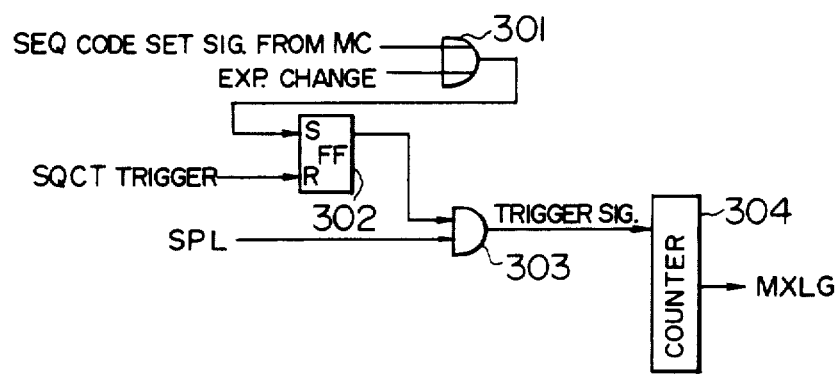

The present invention will now be explained in detail with reference to the accompanying drawings, in which:

FIG. 1 shows a block diagram of a prior art I/O interface,

FIG. 2 shows a time chart illustrating an example of start sequence from a channel to an I/O device shown in FIG. 1, FIG. 3 shows a schematic block diagram of a channel unit in accordance with an embodiment of the present invention, FIG. 4 shows a block diagram of an I/O interface control unit shown in FIG. 3, FIG. 5 shows a flow chart for explaining the operation of FIG. 4, FIGS. 6A and 6B show examples of operational values of registers shown in FIG. 4, and FIG. 7 shows an example of a cycle counter of FIG. 4.

The preferred embodiments of the present invention will now be explained with reference to the drawings.

FIG. 3 shows a block diagram of a channel unit in accordance with one embodiment of the present invention.

In FIG. 3, three functions of the channel are shared by a microprogram control 11, an I/O interface control 12 and a data transfer control 13.

The microprogram control (MC) 11 is connected to a basic processing unit (BPU) and carries out a start process and an end process of a command. The MC 11 is also connected to a main storage (MS) to form a logic unit to control data transfer between the MS and the channel unit 1. More particularly, it fetches a command from the MS to transfer it to the I/O interface control (IFC) 12 so that the IFC 12 carries out the interface control.

The IFC 12 is a logic unit to control the interface between the channel 1 and the I/O device. More particularly, it controls and executes the start sequence and the report sequence as shown in FIG. 2 for the I/O device.

The data transfer control (DTC) 13 is a logic unit for controlling high speed data transfer (burst transfer) between the channel unit 1 and the I/O device. More particularly, when a command given from the channel unit 1 to the I/O device is a READ command or a WRITE command indicating that a subsequent operation is a transfer of continuous data, it controls a data buffer which temporarily stores the data.

In accordance with the present invention, the logic in the I/O interface control 12 is constructed in a simple way, and an expected value is prepared to compare it with an input value in order to effect an advanced control.

FIG. 4 shows a detailed block diagram of the I/O interface control 12 of FIG. 3, and FIG. 5 shows a flow chart illustrating the operation of FIG. 4.

The I/O interface control 12 shown in FIG. 4 comprises a new input tag register 201 in which an input tag signal sampled by a sampling signal SPL is loaded by an input control signal on the interface, an old tag register 202 in which a previous sample is loaded, an input tag expected value register 203 to which an expected value for the next input is loaded, a mask register 204 to mask values which need not be compared, a compare circuit 205 for comparing the input tag with the previous value, another compare circuit 206 for comparing the input tag with the preset expected value, a matrix logic circuit 214 for executing a predetermined logic operation when the input tag is equal to the expected value, an output tag register 210 into which a response signal from the logic circuit 214 is loaded, and counters 212 and 213 of a sequence stage for indicating channel status. The sampling signal SPL may be a usual timing pulse adapted to match a suitable sampling period. A logic operation used when the input tag is not equal to the expected value is prepared in MC 11.

The contents of the registers 202, 203, 204, the counters 212, 213, 215 and a flip-flop 211 may be loaded or set from either of the MC and the matrix logic circuit 214 as indicated in FIG. 4. When suitable initial values should be set in the registers, the counters and the flip-flop for the purpose of starting one sequence, the values are set from the MC. When their states are to be updated during the sequence, the values are usually set from the matrix logic circuit 214 in which the expected values are prestored.

In a step 21 shown in FIG. 5, the channel samples the content of the input control signal line (INTAG) on the I/O interface. In this step, when the output of the flip-flop 211 of FIG. 4 is "0", a sampling pulse SPL which is a timing signal inputted at a constant period is applied to an AND gate 208 so that the AND gate 208 opens to sample the input tag signal from the I/O interface, which signal is loaded to the new input tag register 201.

In a step 22 shown in FIG. 5, the sampled content is compared with the previously sampled content to check if there has been a change on the input tag line (INTAG).

In FIG. 4, the previously sampled content is retained in the old input tag register 202. The contents of the new input tag register 201 and the old input tag register 202 are supplied to the compare circuit 205 for comparison, and if they are equal it indicates no change on the input tag line (INTAG) and hence no response is issued and next sampling takes place after an appropriate sampling period. If the comparison results in non-equality, it shows a change on the input tag line (INTAG) and it is examined whether the change is in the expected input tag signal.

More particularly, in a step 23 of FIG. 5, the new input tag value is compared with the expected value and a comparison result is produced.

In FIG. 4, since the expected value for the input tag signal has been previously loaded in the input tag expected value register 203, the contents of the new input tag register 201 and the input tag expected value register 203 are compared by the compare circuit 206, and if they are equal it is determined that the change in the input tag signal has taken place as expected and the sampling signal SPL is terminated and a cycle counter 209 is enabled to activate the matrix logic circuit 214. If the comparison shows non-equality, the non-equal output of the compare circuit 205 and the non-equal output of the compare circuit 206 are applied to an AND gate 207 to open the AND gate 207 so that the microprogram control (MC) 11 is interrupted to report that an unexpected change has taken place in the input tag signal and to start an exceptional process or an error process.

In the comparisons by the compare circuits 205 and 206, if there is a signal on the input tag line (INTAG) which may be neglected, the position of that signal is loaded into the mask register 204 so that the comparison results of the compare circuits 205 and 206 for that signal position are neglected.

In a step 24 of FIG. 5, if the input tag signal has changed and is equal to the expected value, the matrix logic circuit 214 (1) sets the content of the output tag line (OUT TAG), (2) sets the next expected value for the input tag signal, (3) updates the sequence and the stage and (4) transfers the content of the new input tag register 201 into the old input tag register 202, and then the next sampling operation is initiated.

A sequence code register 215, a sequence counter 212 and a stage counter 213 of FIG. 4 indicate the status (STA) of a start sequence, transfer sequence and report sequence, respectively.

In the respective sequences, each time a unit of information has been exchanged between the channel and the I/O device, the sequence is advanced by one step. Each sequence includes several stages such as address out (ADR OUT), hold out (HLD OUT) and select out (SEL OUT).

When the matrix logic circuit 214 is activated in response to the equality between the input tag signal and the expected value, it determines the current status of the channel unit 1 by the contents of the sequence code (SEQ CODE) register 215, the sequence counter 212, the stage counter 213 and the cycle counter 209, and loads an appropriate output control signal (OUT TAG) to the output tag register 210 as a response signal and sends an appropriate control signal to the bus control logic circuit 216.

Then, it loads the next expected sample value and the mask position into the input tag expected value register 203 and the mask register 204, respectively. It also transfers the content of the new input tag register 201 to the old input tag register 202 as the old input tag value. It also updates the contents of the sequence counter 212 and the stage counter 213.

Thus, the next sampling operation is readied.

FIGS. 6A and 6B show examples of operational values of the registers controlled by the matrix logic circuit of FIG. 4. FIG. 6B follows below FIG. 6A.

The examples shown in FIGS. 6A and 6B illustrate the operation when the start sequence in the I/O interface shown in FIG. 2 is executed.

In FIGS. 6A and 6B, SEQ CODE represents values to be loaded into the sequence code register (SQCD) 215 in FIG. 4, SEQ COUNT represents values to be loaded into the counter (SQCT) 212, STAGE COUNT represents values to be loaded into the stage counter (STCT) 213, CYCLE COUNT represents values to be loaded into the cycle counter (CYCT) 209, OUT TAG represents values to be loaded into the output tag register (OT) 210, IN TAG EXP represents values to be loaded into the input tag expected value register (EXP) 203, INTAG MASK represents values to be loaded into the mask register (MSK) 204, BUS OUT represents a send command of information on the bus-out (BUS OUT), BUS IN SET represents a read-in command of information on the bus-in (BUS IN), BUS OUT ID represents the content of information to be sent to the bus-out (BUS OUT), SAMPLE INHIBIT represents values to be set in the flip-flop (FF) 211, EXP CHANGE represents equality outputs from the compare circuit 206, and STEAL REQ represents a process request from the I/O interface control (IFC) 12 to the microprogram control (MC) 11. CMD OUT, SRVOUT, DATOUT and SUPOUT represent a command out, a service out, a data out and suppress out, respectively. MRK0 OUT, MRK1 OUT and DISC IN represent a mark 0 out, a mark 1 out, a disc in, respectively.

The operation in the start sequence is now explained with reference to FIGS. 6A and 6B.

The operation of the start sequence is started in response to an instruction from MC 11 by setting the sequence code register 215 to "01", the sequence counter 212, the stage counter 213 and the cycle counter 209 to "0" and SAMPLE INHIBIT to "1", that is, the flip-flop 211 to "1" to enable the cycle counter 209. As the cycle counter 209 is enabled, it counts up by one each time a sampling pulse is received.

In FIG. 6A, the content of the cycle counter 209 is represented by hexadecimal notation.

When SQCD = "01", SQCT = "000", STCT = "0000" and CYCT = "01"$_{16}$ are supplied to the matrix logic circuit 214, the matrix logic circuit 214 sends out BUS OUT SET = "1" and BUS ID = "A" to the bus control logic circuit 216. As a result, the bus control logic circuit 216 sends address information supplied from the microprogram control 11 to the bus-out (BUS OUT). At this time point, the stage counter 213 is incremented by one by the matrix logic circuit 214.

When SQCD = "01", SQCT = "000", STCT = "0001" and CYCT = "08"$_{16}$, the matrix logic circuit 214 sets the bit position corresponding to the address-out (ADR OUT) of the output tag register 210 to "1" to send out the address-out (ADR OUT), and increments the stage counter 213 by one.

When SQCD = "01", SQCT = "000", STCT = "0010" and CYCT = "12"$_{16}$, the hold out (HLD OUT) and the select out (SEL OUT) of the output tag register 210 are set to "1", the operational-in (OPL IN) bit position of the input tag expected value register 203 is set to "1", the request in (REQ IN) bit position of the mask register 204 is set to "1", the flip-flop 211 is reset and the sequence counter 212 is incremented by one, and the cycle counter 209 is stopped. The REQ IN is masked because the start sequence is being executed so that a process request from the I/O device cannot be accepted. By resetting the flip-flop 211, the sampling of the INTAG on the I/O interface is started. When the OPL IN on the INTAG is turned on, the contents of the new input tag register 201 and the input tag expected value register 203 are compared. More particularly, when the EXP CHANGE in FIG. 6B is "1", the flip-flop 211 is set and the stage counter 213 and the cycle counter 209 are reset so that the cycle counter 209 is again enabled.

When SQCD = "01", SQCT = "001", STCT = "0000" and CYCT = "01", the matrix logic circuit 214 resets the ADR OUT of the output tag register 210 to "0", sets the expected value of the ADR IN of the input tag expected value register 203 to "1", increments the sequence counter 212 by one, stops the cycle counter 209, resets the flip-flop 211 and then reinitiates the sampling of the I/O interface.

In a similar manner, the contents of the sequence counter 212, the stage counter 213 and the cycle counter 209 are updated in accordance with the content of FIG. 6A and the matrix logic circuit 214 controls the input tag expected value register 203, the output tag register 210 and the bus control logic circuit 216 in accordance with the updated contents so that the predetermined I/O interface sequence is executed.

The matrix logic circuit 214 can be readily designed by tabulating required I/O interface specifications as indicated in FIGS. 6A and 6B and arranging the set and reset conditions of respective bits on OUT TAG, INTAG EXP and INTAG MASK. In FIGS. 6A and 6B, for example, the set and reset conditions on ADR OUT of OUT TAG are as follows, ADR OUT set = (SQCD = 01)·(SQCT = 000)·(STCT = 0010)·(CYCT = 08) and ADR OUT reset = (SQCD = 01)·(SQCT = 000)·(STCT = 0011)·(CYCT = 12). In the other sequence, if further set and reset conditions for ADR OUT are to be added they may simply be ORed.

FIG. 7 illustrates an example of the cycle counter 209, which comprises an OR gate 301 having inputs to receive a start sequence SQCD set signal from MC or an EXP CHANGE=1 i.e., an expected signal on I/O interface, an RS flip-flop 302 having a set terminal to be supplied with an output of OR gate 301 as a start signal and a reset terminal which is triggered with SQCT, an AND gate 303 for ANDing a set output of flip-flop 302 and SPL and a computer 304 which is triggered by the output of the AND gate 303 and whose output is supplied to MXLG 214. The counter 304 starts upon inputting of the SQCD set signal or EXP CHANGE=1 and stops by an updating trigger signal. The updating trigger signal may be produced by a triming pulse the same as the SPL signal.

By designing such a logic in accordance with I/O interface specifications, the I/O interface control 12 of the present invention can be readily realized.

In FIG. 4, when a plurality of combinations of the expected values are present on the input tag line (IN-TAG), plural sets of the input tag expected value registers 203 and the mask registers 204 may be provided.

While FIG. 4 shows the configuration of the I/O interface control 12 in the channel unit 1, it can be readily modified to an interface control of the I/O device by changing the combination of the outputs of the matrix logic circuit 214 of FIG. 4. For example, by storing the sequence in the matrix logic circuit 214 in a RAM, a change of sequence is easily possible to meet different interface specifications and the interface controls for the channel and the I/O device can be implemented by the same logic. Accordingly, in an LSI device, a common LSI may be used for the channel and the I/O device.

As described hereinabove, according to the present invention, the logic of the interface control is simplified and flexible from the point of view of possible modifications and the logic for the normal process is separated from the logic for the error process and the stage is stepped in response to the comparison result of the input tag value and the expected value. Consequently, the interface response speed is increased, the error logic is decreased and the common control logic can be used for the devices of different interface operation specifications. For example, the common LSI can be used for the interface controls of the channel and the I/O device.

What is claimed is:

1. An interface control system comprising:
  (a) means coupled to an interface for sampling an input control signal at said interface;
  (b) first compare means connected to said sampling means for comparing a current sampled value of said input control signal sampled by said sampling means with an expected value for the input control signal;
  (c) response means connected to said first compare means for generating a response signal in response to said input control signal and a next expected value signal representing the expected value of the next input control signal in accordance with a predetermined interface operation specification when said first compare means indicates an equality between the current sampled value and the expected value; and
  (d) means connected to said sampling means for storing a sampled value to provide a previously sampled value signal, second compare means connected to said sampling means and said storing means for comparing the current sampled value of said input control signal with said previously sampled value signal, and means connected to said first and second compare means for generating an abnormal condition signal when both of said first and second compare means indicate compare unequal conditions.

2. An interface control system according to claim 1, further comprising means for generating a mask signal to prevent response by said first and second compare means to an input control signal which may be neglected, and mask indicating means connected to said first and second compare means and responsive to said mask signal from said mask signal generating means for masking an input control signal which may be neglected when the current sampled value is compared with the previously sampled value by said second compare means or when the current sampled value is compared with the expected value by said first compare means to cause said first or second compare means to neglect the masked input control signal.

3. An interface control system between a channel and an input/output (I/O) device comprising;
  microprogram control means connected to a basic processing unit to carry out start and termination operations of a command and connected to a main storage to control data transfer between said main storage and said channel; and
  an I/O interface control circuit connected between said microprogram control means and said channel and operating under the control of control signals from said microprogram control means, said I/O interface control circuit including;
  (a) sampling means coupled to an interface for sampling an input tag signal at said interface;
  (b) first compare means connected to said sampling means for comparing a current sampled value of said input tag signal sampled by said sampling means with a previously generated expected value for the input tag signal and for producing a compare equal or a compare unequal signal as a result of said comparison;
  (c) means connected to said sampling means for storing a sampled value to provide a previously sampled value signal;
  (d) second compare means connected to said sampling means and for storing means for comparing the current sampled value of said input tag signal with said previously sampled value signal and for producing a compare equal or a compare unequal signal as a result of said comparison; and
  (e) logic means connected to said first and second compare means responsive to a compare unequal signal from said second compare means and a compare equal signal from said first compare means to produce at least a response signal in response to said input tag signal of expected value and an expected value for the next sampling of said input tag signal.

4. An interface control system according to claim 3 further comprising AND means for ANDing the compare unequal signal from said second compare means with the compare equal signal from said first compare means, an output signal from said AND means being sent to said microprogram control means as a signal indicating an error condition or an exceptional condition of the input tag signal.

5. An interface control system according to claim 3 or 4 wherein said sampling means is program-controlled by said microprogram control means.

6. An interface control system according to claim 3 or 6 further comprising means for generating a mask signal to prevent response by said first and second compare means to an input tag signal which may be neglected, and mask register means connected to said first and second compare means and responsive to said mask signal from said mask signal generating means for generating an indication signal for masking an input tag signal which is not to be compared and for applying said indicating signal to said first and second compare means to inhibit operation thereof.

7. An interface control system according to claim 3 or 4 wherein said sampling means includes new input tag register means for storing the sampled input tag signal and said storing means includes an old input tag register means for storing the previously sampled value, and further comprising input tag expected value register means connected to said logic means for storing the expected value for the next sampled input tag value, means for applying the output of said new input tag register means to first input terminals of said second and first compare means, and means for applying the output of said old input tag register means and the output of said input tag expected value register means to second input terminals of said second and first compare means, respectively, the output of said second compare means being connected to said logic means whereby, when said second compare means produces a compare equal signal, said logic means is activated.

8. An interface control system according to claim 7 wherein said logic means includes a matrix logic circuit responsive to activation by the output of said second compare means for applying a predetermined signal value on an output tag line of said channel interface, generating said expected value for the next sampled input tag signal, generating a sequence updating signal and transferring the content of said new input tag register means to said old input tag register means.

9. An interface control system according to claim 3 further comprising data transfer control means coupled between said interface control circuit and said microprogram control means and responsive to an output of said logic means for controlling high speed data transfer between said channel and said I/O device.

10. An interface control system between a plurality of devices comprising:
 (a) sampling means coupled to an interface for sequentially sampling input control signals on said interface;
 (b) compare means connected to said sampling means for comparing a current sampled value of said input control signals sampled by said sampling means with an expected value for the input control signal which has previously generated and which varies with the input control signal and for comparing said current sampled value with the previously sampled value of the input control signal, to produce a compare equal signal or a compare unequal signal for each comparison operation;
 (c) logic means connected to said compare means and responsive to the compare equal signal from said compare means for the comparison of the current sampled value and the expected value to produce a response signal in response to the input control signal of expected value and to generate an expected value for next sampling of the input control signal; and
 (d) error detection means connected to said compare means and responsive to the compare unequal signals from said compare means for the comparison of the current sampled value and the expected value and the comparison of the current sampled value and the previously sampled value to produce a signal indicating an error condition or an exceptional condition of the input control signal.

11. An input/output interface controlling device for information exchange between a plurality of devices, such as a channel and one or more input/output devices, comprising:
 sampling means connected to an interface for sampling an input signal from said interface;
 first compare means connected to said sampling means for comparing a current sampled value of said input signal sampled by said sampling means with a previously generated expected value for the input signal to detect an equality between the sampled value and the expected value when the sampled value is equal to the expected value;
 second compare means connected to said sampling means for comparing said current sampled value of said input signal with a previously sampled value to detect an unequality between the current sampled value and the previously sampled value, when the current sampled value is not equal to the previously sampled value, indicating that a change has occurred in said input signal; and
 response circuit means connected to said first and second compare means and responsive to detection of an equality at said first compare means and detection of an inequality at said second compare means for producing a response signal to be applied to said interface and an expected value signal representing the expected value for the next input signal in accordance with a predetermined interface operation specification.

12. An input/output interface controlling device according to claim 11, further comprising gate circuit means connected to said first and second compare means for producing a signal indicating an error condition or an exceptional condition when the current sampled value is found to be not equal to the expected value and the previously sampled value of said input signal.

13. An input/output interface controlling device according to claims 11 or 12, further comprising an expected value register, connected between said first compare means and said response circuit means for temporarily storing said expected value signal which is generated by said response circuit means.

14. An input/output interface controlling device according to claims 11 or 12, further comprising means for generating a mask signal to prevent response by at least said first compare means to an input signal which may be neglected, and mask indicating means connected to said first compare means and responsive to said mask signal from said mask signal generating means for masking an input signal which is supplied to said first compare means when the current sampled value is not to be compared with an expected value from said response circuit means by the first compare means.

15. An input/output interface controlling device, according to claim 12, wherein said gate circuit means includes AND means for ANDing the compare unequal signal from said second compare means and the compare unequal signal from said first compare means to produce the signal indicating an error condition or an exceptional condition.

16. An input/output interface controlling device according to claim 13, further comprising new input tag register means connected to said sampling means for storing the current sampled value of said input signal and old input tag register means connected to said new input tag register means for storing the previously sampled value of said input signal, the output of said new input tag register means being connected to first input terminals of the first and second compare means and the output of said old input tag register means and the output of said expected value register being connected to second input terminals of said first and second compare means, respectively; and means responsive to said first compare means producing a compare equal signal for activating said response circuit means.

17. An input/output interface controlling device according to claim 16, wherein said response circuit means includes means, when activated, for generating a sequence updating signal, for transferring the contents of said new input tag register means to said old input tag register means and for generating a signal to initiate the next sampling operation.

18. Input/output interface controlling device according to claim 11, wherein said response circuit means includes an alterable memory element for effecting operations in accordance with said predetermined interface operation specification.

19. An input/output interface controlling device for information exchange between a plurality of devices, such as a channel and one or more input/output devices, comprising:
sampling means connected to an interface for sampling an input signal from said interface;
first compare means connected to said sampling means for comparing a current sampled value of said input signal sampled by said sampling means with a previously generated expected value for the input signal to produce a compare equal signal when the sampled value is equal to the expected value;
second compare means connected to said sampling means for comparing said current sampled value of said input signal with a previously sampled value to produce a compare unequal signal, when the current sampled value is not equal to the previously sampled value, indicating that a change has occurred in said input signal; and
response circuit means connected to said first and second compare means and responsive to a compare equal signal from said first compare means and a compare unequal signal from said second compare means to produce a response signal to said interface and an expected value signal representing the expected value for the next input signal in accordance with a predetermined interface operation specification.

* * * * *